Jan. 4, 1927.
R. P. F. LIDDELL
1,613,467
LUBRICATING SYSTEM
Filed Feb. 11, 1926  2 Sheets-Sheet 1
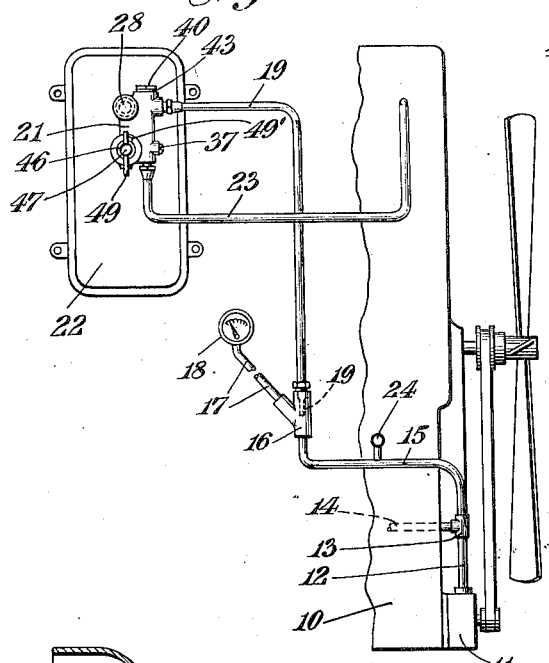
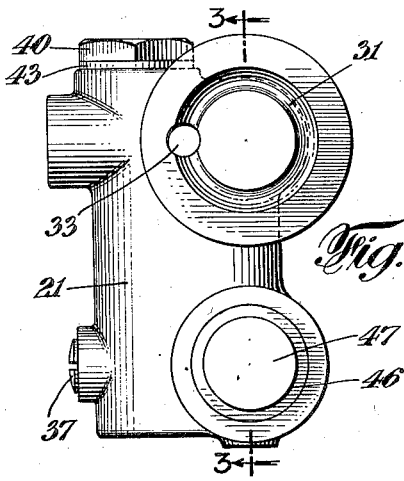
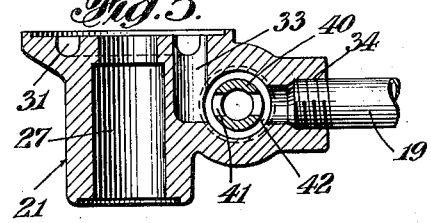
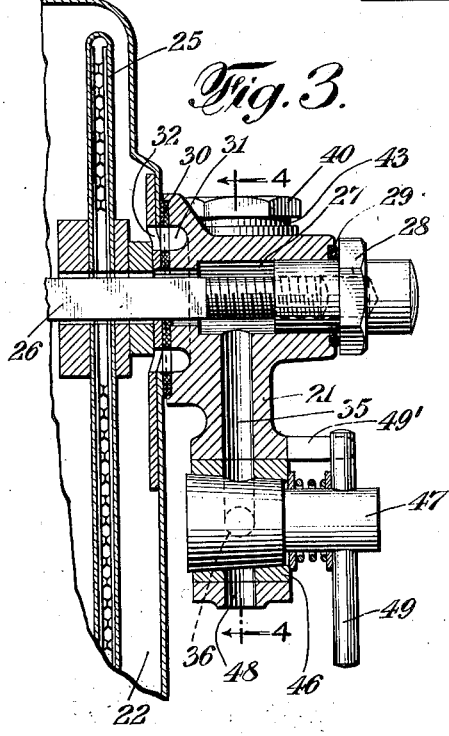
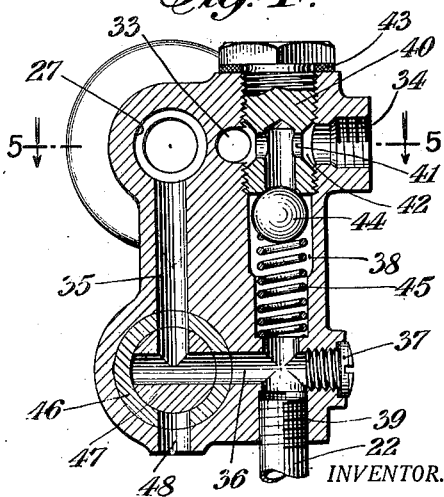
INVENTOR.
BY Robert P. F. Liddell
Kenyon & Kenyon
ATTORNEYS.

Jan. 4, 1927. 1,613,467
R. P. F. LIDDELL
LUBRICATING SYSTEM
Filed Feb. 11, 1926    2 Sheets-Sheet 2
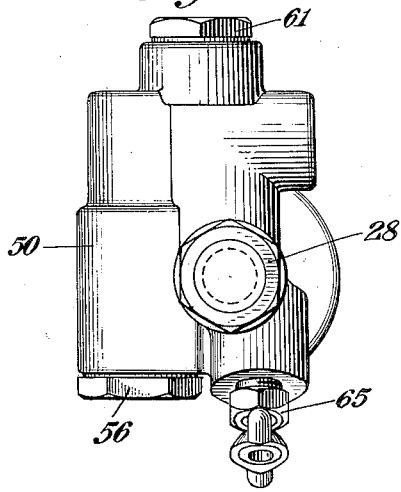
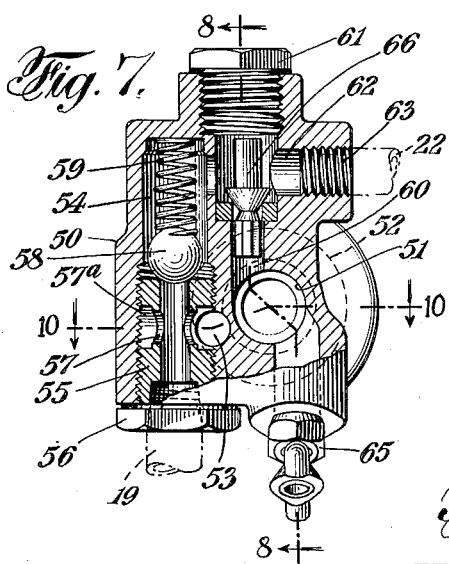
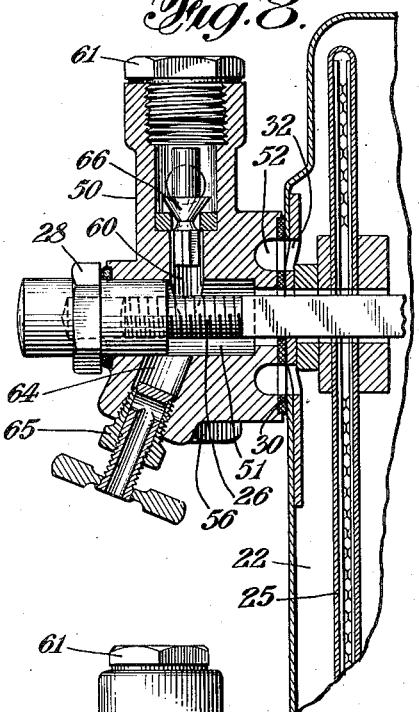
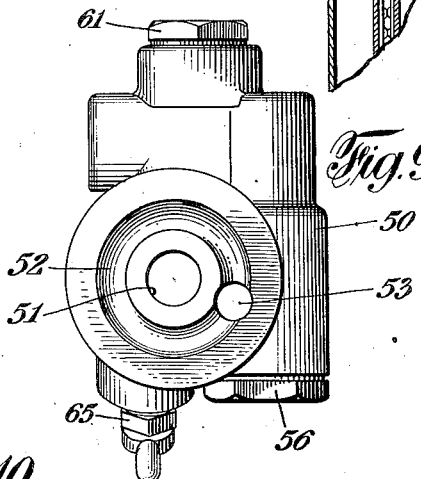
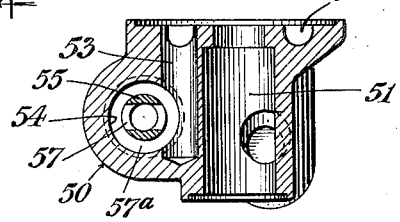
INVENTOR.
Robert P. F. Liddell
BY Kenyon & Kenyon
ATTORNEYS.

Patented Jan. 4, 1927.

1,613,467

UNITED STATES PATENT OFFICE.

ROBERT P. F. LIDDELL, OF NEW YORK, N. Y., ASSIGNOR TO MOTOR IMPROVEMENTS, INC., OF NEWARK, NEW JERSEY, A CORPORATION OF DELAWARE.

LUBRICATING SYSTEM.

Application filed February 11, 1926. Serial No. 87,483.

This invention relates to lubricating systems and more especially to oil filtering systems adapted for use in connection with automotive engines.

In lubricating systems of this type, oil is pumped from the crank case to the bearings through a filter which, when operating at normal capacity, discharges a sufficient amount of oil properly to lubricate the bearings. However, if the oil in this system is excessively viscous because of being cold, as at the start of the engine with which the system is being used, or the filter is clogged so that the filter does not function at normal capacity, the oil discharged from the filter may be insufficient for proper lubrication of the bearings. To insure a proper supply of oil to the bearings a by-pass is provided between the supply line to, and the discharge line from, the filter, the by-pass being normally closed by a relief valve, the operation of which is responsive to conditions in the supply line, so that when conditions demand it oil is fed directly from the pump to the bearings. To permit inspection of the filtered oil means are provided for draining oil from the discharge line. As it is sometimes desirable to test the oil being discharged from the filter at a time when some oil is being by-passed around the filter, the oil drained for inspection may contain unfiltered oil as well as filtered oil.

An object of this invention is a simple and efficient oil filtering system in which is assured delivery of a proper supply of oil to the bearings and in which filtered oil may be drained from the discharge line to the exclusion of unfiltered oil.

One way of attaining this object is by attaching to the filter a fitting provided with channels for supplying oil to, and discharging oil from, the filter and also provided with a by-pass from the supply channel to the discharge channel, the by-pass being controlled by a pressure responsive valve permitting flow of oil from the inlet to the outlet channel when the filter is not discharging sufficient oil properly to lubricate the bearings. In the discharge line is provided a sampling or test port together with means for controlling communication between said port and discharge line and preventing flow of oil from the by-pass to the sampling or test port. Thus the bearings are always supplied with a proper amount of oil either filtered or unfiltered and filtered oil uncontaminated with unfiltered oil may be drawn off for inspection.

Other objects, novel features and advantages of this invention will be apparent from the following specification and accompanying drawing, wherein—

Fig. 1 discloses a filtering system embodying the invention.

Fig. 2 is a side elevation of the fitting.

Fig. 3 is a section through the fitting and a portion of the filter, the section being taken on the line corresponding to 3—3 of Fig. 2.

Fig. 4 is a section on the line 4—4 of Fig. 3.

Fig. 5 is a section on the line 5—5 of Fig. 4.

Fig. 6 is a side elevation of a modified fitting.

Fig. 7 is a view similar to Fig. 6 but largely broken away to show the interior of the fitting.

Fig. 8 is a section through the fitting and filter, the section being taken along the line 8—8 of Fig. 7.

Fig. 9 is a reverse view of Fig. 6, and

Fig. 10 is a section on the line 10—10 of Fig. 7.

Referring now to Figs. 1 to 5 inclusive, Fig. 1 discloses diagrammatically a lubricating system of an automotive engine. 10 represents the engine proper and 11 an oil pump, the inlet of which communicates with the crank case of the engine whereby oil in the crank case may be pumped through the lubricating system. The outlet of the pump 11 is connected by a pipe 12 with a T connection 13 from which extends a pipe line 14 for supplying oil to the main bearings of the engine. A second pipe line 15 leads from the T connection to a Y connection 16, one arm of which is connected through the pipe 17 to a gauge 18. The other arm of the Y connection 16 is provided with a passageway 19 of reduced diameter and a pipe 20 leads from this arm to a fitting 21 mounted on the casing of filter 22, the fitting being designed to supply unfiltered oil to the filter and discharge filtered oil therefrom into a pipe 23 which leads to subordinate bearings such as the rocker arm bearings or the like from whence the oil is returned to the crank case. The passageway 19 in the Y connection 16 is of such diameter and length as to effect a material reduction in the pressure in the system from that point on. A safety blow-off valve 24 is provided in the pipe 15 to prevent pressure in the system exceeding a predetermined limit.

The filter 22 preferably consists of a casing within which are provided a number of filtering units 25. A bolt 26 passes through apertures in the filtering units and also extends through an opening in the filter casing. The fitting 21, which is preferably a casting of aluminum or other suitable metal, is attached to the filter casing by the bolt 26. Extending through the fitting 21 is a passageway 27 having a portion of reduced diameter through which the bolt 26 extends into the larger portion of the passageway. A nut 28 has a cylindrical portion projecting into the passageway 27, this portion being interiorly threaded to receive the end of the bolt 26. Tightening the nut 28 on the bolt 26 draws the fitting into contact with the filter casing. A gasket 29 is provided to make a fluid-tight connection between the end of the passage 27 and the nut 28 and another gasket 30 is interposed between the casing and the fitting to form a fluid tight connection at this point. The bolt 26 is square and thus provides channels leading into the passageway 27 whereby oil may be discharged from the filter units into the passageway 27.

An annular channel 31 concentric with the reduced portion of passageway 27 is provided in the face of the fitting 21 engaging the filter casing and registers with apertures 32 in the filter casing through slots in the gasket 30. A conduit 33 extends from the channel 31 parallel to the passageway 27 for a short distance and then turns at right angles terminating in a threaded socket 34 to which the pipe 19 is connected in any suitable manner. A channel 35 extends from the passageway 27 and communicates with a channel 36 perpendicular thereto and terminating in a socket closed by a plug 37.

A bore 38 extends through the fitting 21 in a direction parallel to the channel 35 and at right angles to the passageway 27. This bore intersects both the conduit 33 and the channel 36. The end of the bore adjacent the channel 36 terminates in a threaded socket 39 by means of which the pipe 22 may be attached to the fitting. The passageway 27, channel 35, channel 36 and pipe 22 constitute an outlet from the filter for the filtered oil. The opposite end of the bore 38 is closed by a plug 40 which extends beyond the intersection of the bore 38 with the conduit 33. The inner end of the plug 40 is hollow and ports 41 lead from the interior of the plug to an annular channel 42 formed in the plug in alinement with the conduit 33. The pipe 20, ports 41, conduit 33, channel 31 and apertures 32 provide an inlet for supplying oil to the filter. A gasket 43 is interposed between the head of the plug 40 and the fitting to produce an oil tight joint. The mouth of the hollow portion of plug 40 is normally closed by a ball 44 held in position by a spring 45, the end of which rests upon a shoulder formed in the bore 38.

Under normal operating conditions, oil is fed into the filter from the pipe 19 through the ports 41 or channel 42, the conduit 33, channel 31 and apertures 32 in the filter casing and discharged from the filter along the bolt 26, passageway 27, channel 35, channel 26 and pipe 22. However, if the pressure in the supply line exceeds the predetermined limit due to the failure of the filter to function at normal capacity either because of the excessive viscosity of the oil due to cold or the clogging of the filter for any reason, the ball 44 will be forced back against the action of the spring 45 thereby opening the mouth of the hollow portion of the plug 40 to permit oil to flow through the by-pass 38 from the pipe 20 to the pipe 23, thus insuring a proper supply of oil to the bearings.

To permit inspection of oil discharged from the filter, drainage means are provided in the discharge line. This drainage means is arranged at the intersection of the channels 35 and 36 and comprises a valve sleeve 46 having ports communicating with the channels 35 and 36 and a three-way valve 47 arranged in said sleeve. There is provided a test port 48 communicating with a third port in the sleeve 46. The valve 47 is operated by a handle 49 which when the valve is in the position shown in Figs. 4 and 5 engages a stop 49'. With the valve in the position shown in Fig. 5, oil discharged from the filter flows directly to the pipe 23. However, if it is desired to inspect the oil being discharged from the filter, the valve is rotated in a counter-clockwise direction thus shutting off the channel 36 and bringing the channel 35 into communication with the drainage port 48. This arrangement insures that the oil drained from the system will be only filtered oil for if, at the time the oil is drained, it happens that conditions in the supply line are such that oil is flowing through the by-pass, the oil can not flow from the by-pass to the drainage port 48. The stop 49 is so arranged as to prevent the valve 47 being moved into position in which both the channels 35 and 36 would both be in communication with the port 48. This renders it impossible for oil from the by-pass 38 to be drained through the port 48.

Referring now to Figs. 6 to 10 inclusive, 50 represents the fitting in which is provided a passageway 51 having a reduced portion through which the bolt 26 extends into the larger portion of the passageway. There is provided a nut 28 having a cylindrical interiorly threaded portion extending into the passageway 51 and receiving the threaded end of bolt 26, the fitting being clamped to the casing by the nut in the manner described in connection with the embodiment of the invention disclosed in Figs. 2 and 5. An annular channel 52 concentric with the reduced portion of the passageway 51 communicates with apertures 32 in the filter casing through slots in the gasket 30. From the channel 52 extends a conduit 53 parallel to the passageway 51. A bore 54 extends substantially the full length of the fitting in a direction perpendicular to the conduit 53 and passageway 51 and intersects the conduit 53. The open end of the bore 54 is closed by a tubular plug 55 threaded in the end, this plug being provided with a hexagonal head 56 by means of which it may be screwed into and out of position. Ports 57 provide communication between the interior of the plug and an annular channel 57a formed on the plug 55 in alinement with the conduit 53. The inner end of the plug 55 is normally closed by a ball 58 which is held in position by a spring 59 engaging the end of the bore 54. A channel 60 leads from the passageway 51 parallel to the bore 54 and terminates in a threaded socket closed by the plug 61. A channel 62 leads from the bore 54 through the channel 60 and terminates in a threaded socket 63 to which the pipe 22 is attached in any desired manner.

Under normal operating conditions oil is fed from the pipe 19 through the plug 55, ports 57 or channel 57a, conduit 53, annular channel 52 and apertures 32, into the filter casing and is discharged along the bolt 26, passageway 51, channel 60, past the valve 65, through channel 62 into the pipe 22. If, however, the pressure in the inlet pipe 20 exceeds a predetermined limit either because the filter has become clogged or the oil is too viscous to pass through it freely or for any other reason, the ball 58 is lifted from engagement with the plug 55 and allows oil to flow through the plug 55, bore 54, and the channel 62 through to the pipe 22, thus insuring a proper supply of oil to the bearings.

To permit inspection of oil discharged from the filter there is provided a drainage port 64 communicating with the passageway 51 and which is normally closed by a valve 65 which may be of any standard commercial type but is here shown as comprising a plug having a tubular member threaded therein and having a transverse channel which, when the valve is closed, is drawn within the plug, and which, when the valve is open, lies beyond the end of the plug. In order to prevent oil flowing from the by-pass 54 to the drainage port 64 by way of the channel 60 and passageway 51, a check valve 66 is provided at the end of the channel 60 communicating with the channel 62. Thus when the valve 65 is opened to drain filtered oil from the passageway 51 the oil pressure in the passageway 51 is decreased and should oil be flowing through the by-pass at this time the pressure of it against the check valve 36 causes the latter to close the channel 60 and prevent oil flowing through it from the by-pass to the passageway 51. This arrangement also effectively prevents unfiltered oil from reaching the test opening 64 and thus permits drawing off of filtered oil uncontaminated with unfiltered oil. In this instance, however, the means for preventing unfiltered oil from reaching the drainage opening is operable by virtue of changes of pressure when the drainage valve is open rather than manually as in the modification first described.

While this invention has been disclosed as applied to a filtering system in which only a portion of the oil is normally directed through the filter, it is of course evident that the invention is equally well applicable to systems in which all the oil is normally directed through the filter. It is also of course understood that various modifications may be made in the structure of the device herein disclosed without in any way departing from the spirit of the invention as set forth in the appended claims.

What I claim as new and desire to secure by Letters Patent of the United States is:

1. In a purifying system, a purifier having inlet and outlet ports, supply and discharge conduits communicating with said inlet and outlet ports respectively, a by-pass between said conduits, a relief valve controlling said by-pass and arranged to permit flow from said supply to said discharge conduit when a predetermined pressure difference exists between fluid in said conduits, a sampling channel communicating with said discharge conduit and valve means for permitting flow of fluid from said discharge conduit through said sampling channel while preventing flow of fluid from said by-pass through said sampling channel.

2. A device of the character described, having supply and discharge channels, a by-pass between said channels, a relief valve controlling said by-pass and arranged to permit flow from said supply to said discharge channel when a predetermined pressure difference exists between fluid in said channels, a sampling port and valve means for permitting flow of fluid from said discharge channel through said sampling port while preventing flow of fluid from said by-pass through said sampling port.

3. A device of the character described, having supply and discharge channels, a by-pass between said channels, a relief valve controlling said by-pass and arranged to permit flow from said supply to said discharge channel when a predetermined pressure difference exists between fluid in said channels, a sampling port communicating with said discharge channel ahead of the junction between the discharge channel and the by-pass and a check valve to prevent flow of fluid from said by-pass to said sampling port.

4. A device of the character described, having supply and discharge channels, a by-pass between said channels, a relief valve controlling said by-pass and arranged to permit flow from said supply to said discharge channel when a predetermined pressure difference exists between fluid in said channels, a sampling port communicating with said discharge channel ahead of the junction between the discharge channel and the by-pass, and a check valve in that portion of the discharge channel between the junction of the discharge channel and the by-pass and the point at which the sampling port communicates with the discharge channel, to prevent flow of fluid from said by-pass to said sampling port.

5. A device of the character described, having supply and discharge channels, a by-pass connecting said channels, a relief valve in said by-pass normally resisting flow from said supply to said discharge channel, a sampling port communicating with said discharge channel and a check valve between said sampling port and said by-pass to prevent flow of fluid from said by-pass to said sampling port.

6. A device of the character described, having supply and discharge channels, a by-pass between said channels, a relief valve controlling said by-pass and arranged to permit flow from said supply to said discharge channel when a predetermined pressure difference exists between fluid in said channels, a sampling port communicating with said discharge channel ahead of the junction between the discharge channel and the by-pass, a check valve in that portion of the discharge channel between the junction of the discharge channel and the by-pass and the point at which the sampling port communicates with the discharge channel, and a valve controlling flow through said sampling port.

7. A device of the character described having inlet and outlet channels, a drainage port, a passageway communicating with said channels, a relief valve permitting flow from said inlet channel to said outlet channel, a valve to establish communication between said drainage port and said outlet channel and a check valve interposed between said first mentioned valve and said passageway.

8. In a purifier system, a purifier comprising a casing having inlet and outlet ports, a purifying element in said casing and communicating with said inlet port, supply and discharge conduits communicating with said inlet and outlet ports respectively, a by-pass between said conduits, a relief valve controlling said by-pass and arranged to permit flow from said supply to said discharge conduit when a predetermined pressure difference exists between said fluid in said conduits, a sampling channel communicating with the interior of said casing, and a check valve in that portion of the discharge conduit between the outlet port of the filter and the junction of the discharge conduit and by-pass.

9. In a purifying system, a purifier having inlet and outlet ports, supply and discharge conduits communicating with said inlet and outlet ports respectively, a by-pass between said conduits, a relief valve controlling said by-pass and arranged to permit flow from said supply to said discharge conduit when a predetermined pressure difference exists between fluid in said conduits, a sampling channel communicating with said discharge conduit intermediate the outlet port of the filter and the junction of said discharge conduit and by-pass and a check valve in that portion of the discharge conduit between said junction and the point at which said sampling channel communicates with said discharge conduit.

10. A device of the character described having inlet and outlet channels, a passageway connecting said inlet and outlet channels, a hollow plug in said passageway extending across the junction of said inlet channel and passageway, a port communicating with the interior of said plug and said inlet channel, and a relief valve in said passageway normally resisting flow from said inlet to said outlet channel.

11. A device of the character described having inlet and outlet channels, a passageway connecting said inlet and outlet channels, a hollow plug in said passageway extending across the junction of said inlet channel with said passageway, ports leading from the interior of said plug to an annular channel in said plug communicating with said inlet channel, and spring-actuated means normally closing the end of said plug.

12. A device of the character described having inlet and outlet channels, a passageway connecting said channels, a hollow plug in said passageway extending across the junction of said passageway with said inlet channel, said plug being apertured to permit communication between the interior thereof and said inlet channel, a ball closing the end of said plug, and resilient means for normally maintaining said ball in closing position.

13. In combination, a filter having inlet and outlet ports, a fitting having inlet and outlet channels communicating with said ports, a passageway connecting said channels, a relief valve in said passageway normally resisting flow from said inlet to said outlet channel, a test port communicating with said outlet channel, and a check valve between said test port and said passageway.

In testimony whereof, I have signed my name to this specification.

ROBERT P. F. LIDDELL.